United States Patent Office 3,318,968
Patented May 9, 1967

3,318,968
METHOD OF AND CATALYST FOR THE DE-HYDROGENATION OF ALIPHATIC HYDROCARBONS
Joseph Edouard Weisang and Jean Louis Weill, Le Havre, France; Luce Madeleine Thevenet, administratrix of the Estate of said Jean Louis Weill, deceased, assignors to Compagnie Francaise de Raffinage, Paris, France
No Drawing. Filed July 7, 1965, Ser. No. 470,254
Claims priority, application France, July 8, 1964, 981,138, Patent 1,413,913
18 Claims. (Cl. 260—683.3)

The present invention relates to the catalytic de-hydrogenation of aliphatic hydrocarbons. It has for its main object new catalysts which facilitate the actual de-hydrogenation at the expense of the de-hydrocyclization. It also comprises a method of preparation of these catalysts and their utilization in a method of de-hydrogenation of aliphatic hydrocarbons to less-saturated hydrocarbons, with a lower production of cyclic hydrocarbons.

The chemical synthesis industries utilize unsaturated hydrocarbons in large quantities, especially olefins and diolefins, because these are highly reactive products suitable for addition to various classes of radicals. In particular, the industries which manufacture soap, greases, alcohols, detergents, etc., consume large quantities of olefins. It is therefore of the greatest advantage to convert the saturated hydrocarbons which are in consequence only slightly reactive and which are contained in petroleum products to the less saturated hydrocarbons, the need for which is constantly increasing.

In order to carry out this conversion, various methods of cracking are already known. These methods result in a breaking-up of the molecule of the saturated hydrocarbon into several molecules, from which the valuable unsaturated hydrocarbons are recovered. The efficiency of these methods is however adversely affected by the formation of molecules with a small number of carbon atoms or by the combustion of the starting hydrocarbon when the operation is carried out in the presence of oxygen.

Methods of de-hydrogenation are also known which convert the saturated hydrocarbons to less-saturated hydrocarbons by means of catalysts. However, the catalysts employed up to the present time have only permitted the selective de-hydrogenation of hydrocarbons with less than 6 atoms of carbon per molecule; in fact, the hydrocarbons with longer carbon chains not only give rise to the corresponding olefins or diolefins but to a mixture of these latter with aromatic hydrocarbons derived from the de-hydrocyclization of the starting hydrocarbon. The quantities of olefins or diolefins collected are therefore too small for such a method to be considered as a valid source of these products. Amongst the catalyst recommended in these methods, there are found, amongst others, those which are formed by chromium oxide $Cr_2O_3$ and by alumina, with promoters of which the most frequently employed are composed of the alkali metals and in particular of potassium.

The present invention forms part of this class of methods, but it obviates their disadvantages and provides a category of catalysts which facilitate the de-hydrogenation of hydrocarbons at the expense of the de-hydrocyclization reactions.

The researches made by the applicants have in fact shown in a quite unexpected manner, that the simultaneous presence of compounds of silver, chromium and an alkali metal on a refractory oxide support gives a catalyst thus constituted a high de-hydrogenating power and, on the contrary, a low de-hydrocyclizing power at temperatures at which the crackling reactions are small.

Thus, the de-hydrogenation of normal heptane over a catalyst of chrome, silver and potassium deposited on an alumina support, gives rise to a large quantity of normal heptene and, on the contrary, a very small quantity of toluene, which, to the best of the applicants' knowledge had never been previously obtained when utilizing known catalysts.

By preparing catalysts of silver, chromium and potassium, the applicants have observed that a good selectivity of the catalyst is obtained, that is to say, it facilitates de-hydrogenation and only permits a small amount of de-hydrocyclization and cracking—when the support is impregnated in two adsorptions with a silver salt on the one hand and a hexavalent chromium compound, chromic anhydride or alkali chromate on the other, and then plunged into the solution of an alkali metal salt. The adsorption of the chromium compound can be carried out before or after that of the silver salt.

On the basis of this work and its results, the invention has mainly for its object, by way of new industrial products, selective de-hydrogenation catalysts constituted essentially by compounds of silver, chromium and an alkali metal, deposited on a support of refractory oxide.

The invention also comprises a method of preparation of these catalysts, consisting in immersing a support, successively and in any order, in two aqueous solutions, one of a silver salt, the other of a hexavalent chromium compound, and then plunging the support thus impregnated into an aqueous solution of an alkali metal salt.

Finally, the invention covers a method of de-hydrogenation of aliphatic hydrocarbons to less-saturated hydrocarbons with a very small production of cyclic hydrocarbons, the said method being characterized in that the above-mentioned catalysts are employed and in that the operation is carried out at a temperature comprised between about 400° and 550° C.

In the catalysts according to the invention, the chromium is most frequently found in the from of the oxide $Cr_2O_3$. The proportion of the chromium compound, calculated in metallic chromium, is comprised between 0.5 and 15% and more particularly between 2% and 10% by weight. Beyond 15% the de-hydrocyclizing activity of the chromium again becomes preponderant with respect to its de-hydrogenating activity and in addition there are produced cracking reactions of the charge and insomerization reactions which reduce the yield of the desired product.

The quantity of silver present in the catalyst must be such that the atomic ratio Ag/Cr is comprised between 0.5/1 and 2.5/1; the quantity of metallic silver however does not exceed 40% of the weight of the catalyst.

The proportion of alkali metal present in the catalyst must be comprised between 0.2 and 5% and preferably between 1 and 2.5% by weight. Potassium is the alkali metal most recommended, but good results are also obtained by replacing it wholly or partly by sodium, lithium, rubidium or caesium.

The support employed is a refractory oxide, that is to say an oxide in which the chemical composition does not vary within the conditions of the reaction. Examples of supports which can be utilized for the catalysts according to the invention comprise alumina, silica, magnesia, oxide such as that of zinc ZnO, or mixtures of these compounds. The oxide of calcium CaO may also be employed as a support, for example mixed with alumina.

Without departing from the scope of the invention, it is possible to add to the catalysts described above promoters such as beryllium oxide.

The catalysts according to the invention are prepared following a process characterized by a double adsorption. As has been previously indicated, the silver and the chromium are adsorbed successively on the support in any order, while the alkali metal is adsorbed subsequently in the form of a solution of one of its salts. However, the alkali metal may also be adsorbed at the same time as the chromium.

The adsorption is effected equally well on a support which is in the form of grains as in the form of powder.

The various methods of carrying out these adsorptions are defined below.

The adsorption of the silver is effected by plunging the support into a solution of one of its salts, for example the nitrate, in a concentration comprised between about 5 and 160 grams per litre.

The chromium is adsorbed by plunging the support into an aqueous solution of a hexavalent chromium compound, for example potassium chromate ($K_2CrO_4$), the concentration of which is comprised about 1 and 50 grams per litre.

In practice, each of these two adsorptions is carried out by dipping the support into the solution at the rate of 100 grams per half to 2 litres, for 1 to 24 hours, at the ambient temperature or slightly above.

Finally, when the adsorptions are completed, the doubly-impregnated support is dipped into a solution of a salt of the alkali metal, for example the nitrate; the whole is then left in a water bath for 2 to 6 hours, which has the object either of adjusting the quantity of alkali metal adsorbed on the surface of the support, or to adsorb the alkali metal when this was not in the form of an alkali salt of hexavalant chromium or again of replacing one alkali metal by another.

The exact duration of each of the various adsorptions is determined by the quantity of product which it is desired to deposit on the support, and the operation is stopped when this quantity has effectively been deposited. The quantities deposited are measured by the fall in concentration of the mother solution in compounds of silver, chromium and alkali metal. The silver compounds are estimated by the gravimetric method in the form of silver chloride; the compounds of hexavalent chromium are estimated volumetrically by an excess of ferrous sulphate (Mohr's salt) titrated by potassium permanganate; the alkali metal is estimated by emission spectrometry.

The catalysts according to the invention permit the conversion of aliphatic hydrocarbons to less saturated aliphatic hydrocarbons with the same number of carbon atoms per molecule with a lower proportion of de-hydrocyclization. In particular, they facilitate the de-hydrogenation of the n-paraffins of 2 to 20 atoms of carbon per molecule to n-olefins and to diolefins, the latter being especially produced from paraffins with 4 to 5 atoms of carbon per molecule. They also facilitate the de-hydrogenation of iso-paraffins to iso-olefins with the same carbon structure. Examples of de-hydrogenation comprise those of n-heptane to n-heptene, of n-dodecane to n-dodecene, of n-hexadecane to n-hexadecene, of 2-methyl butane to 2-methyl butene-2 and isoprene, of butane to butene and butadyene, of iso-octane to iso-octene, iso-heptanes to iso-heptenes, etc.

The catalysts can be employed in various types of reactors in a fixed or moving or fluidized bed.

The temperature of the reaction is comprised between about 400° and 550° C. and preferably between 450° and 510° C. At low temperatures, the reaction does not take place, whereas at a higher temperature the formation is observed of aromatic hydrocarbons by de-hydrocyclization and also an increase in cracking products.

The contact time, reckoned from the moment when the hydrocarbons to be de-hydrogenated have acquired the conditions which exist in the reactor, can vary within wide limits, between 0.5 and 40 seconds, without the selectivity of the catalyst varying considerably. Below 0.5 second, the conversion is inadequate and above 40 seconds de-hydrocyclization reactions take place.

The reactions of de-hydrocyclization and cracking can be reduced if the hydrocarbon to be treated is diluted in an inert gas such as steam so as to reduce its partial pressure.

Various methods of operation for carrying the invention into effect are described in the following examples, which have no limitative nature.

Example I

Alumina is utilized as the support, having an adsorption surface of 398 sq. m. per gram and which is produced in the form of balls having a diameter comprised between 2 and 5 mm.

500 grams of this alumina is plunged into 5 litres of a solution of silver nitrate at 66.4 grams per litre, at ambient temperature for 15 hours.

The concentration of the solution in metallic silver, which was 42.16 grams per litre before the adsorption, has fallen to 36.99 grams per litre after the adsorption.

The balls thus enriched with silver are then plunged into 5 litres of a solution of potassium chromate at 30.22 grams per litre, or 8.09 grams per litre of metallic chromium, for 15 hours at the ambient temperature.

The final concentration of the solution in metallic chromium is 5.36 grams per litre.

After these two impregnations, the balls have an atomic ratio Ag/Cr of 0.90/1 and their content of potassium is about 1.5% by weight.

In order to adjust the potassium content, the balls are treated by dipping them at a proportion of 20 grams per litre in a 5% solution by weight of potassium nitrate, and putting the whole in a water bath for 2 hours.

After drying, the balls are introduced into a Pyrex reactor. The catalyst is then pre-treated at 500° C. in a hydrogen atmosphere for 15 hours.

Normal heptane at a temperature of 465° C. is then passed into this reactor; the contact time is 10 seconds.

With respect to the n-heptane introduced, there are collected from the effluents, by weight: 89.5% of unconverted normal heptane, 5.17% of normal heptene, only traces of aromatic hydrocarbons and 1.8% of cracking products.

Example II

Over the catalyst prepared and pre-treated as described in Example I, there is passed normal dodecane of 97.5% purity at 470° C. and for a duration of contact of 7 seconds.

With respect to the n-dodecane introduced, the effluents are composed, in addition to 86.57% of unconverted n-dodecane, 5.90% of normal dodecene, 2.39% of iso-dodecene, 1.41% of aromatic hydrocarbons and 3.72% of cracking products.

The same test carried out at 490° C. gives, by weight: 78.66% of unconverted n-dodecane, 8.19% of n-dodecene, 3.05% of iso-dodecene, 3.66% of aromatic hydrocarbons and 6.41% of cracking products.

Example III

A catalyst is prepared by double adsorption and treatment with potassium nitrate, employing as the support the same alumina as in Example I, but in the form of powder.

The solution of silver nitrate falls from a concentration of 39.22 grams per litre of metallic silver before adsorption to 34.23 grams per litre after the adsorption.

The solution of potassium chromate falls from 8.052 grams per litre of metallic chromium to 5.37 grams per litre.

After treating with a 5% solution of potassium nitrate, the catalyst is dried and then it is made into pastilles and finally ground to a granular size of 0.2 to 1 mm.

Table I below shows the results of the de-hydrogenation of n-heptane carried out over this catalyst with a time of contact of 10 seconds, at different temperatures.

TABLE I

The quantities of products are expressed in percentage by weight.

| Temperature, °C. | n-Heptane | n-Heptene | Cracking | Aromatics |
|---|---|---|---|---|
| 470 | 93.36 | 5.28 | 1.36 | 0 |
| 480 | 90.60 | 7.12 | 2.27 | 0.35 |
| 490 | 90.54 | 6.88 | 2.56 | Traces |
| 500 | 88.41 | 6.77 | 3.45 | 1.37 |

Example IV

A catalyst is prepared by using as a support the same alumina in balls as in Example I.

500 grams of this support is plunged into 5 litres of silver nitrate at 37.705 grams per litre of metallic silver. The support thus enriched with silver is then plunged into a solution of potassium chromate at 8.181 grams per litre of metallic chromium.

After these two adsorptions, the catalyst contains, by weight, 2.61% of chromium, 6.49% of silver and 1.2% of potassium.

100 grams of this catalyst are then plunged into 1 litre of a solution having 5% by weight of potassium nitrate, and the whole is left in a water bath for 3 hours.

The catalyst finally contains 2.3% by weight of metallic potassium.

This catalyst is employed for the de-hydrogenation of n-heptane with a contact time of 10 seconds at 490° and 500° C.

There are produced practically no aromatic hydrocarbons nor iso-heptenes.

The quantities of n-heptene and cracking products formed are given in Table II below.

TABLE II

| Temperature, °C. | n-Heptene in percent by weight | Cracking in percent by weight |
|---|---|---|
| 490 | 6.78 | 1.93 |
| 500 | 8.27 | 2.96 |

Example V

A catalyst is prepared as in Example IV, but the final treatment is effected with a solution of sodium nitrate at 10% by weight.

After this treatment, the catalyst only contains 0.09% of potassium, but it contains 1.23% by weight of sodium, that is to say that in practice the sodium replaces the potassium.

The de-hydrogenation of the n-heptane over this catalyst, with a contact time of 10 seconds at 480° and 490° C. only gives traces of aromatic hydrocarbons. The yields in n-heptene and cracking products are given in Table III below.

TABLE III

| Temperature, °C. | n-Heptene in percent by weight | Cracking in percent by weight |
|---|---|---|
| 480 | 6.48 | 4.71 |
| 490 | 6.42 | 5.69 |

These examples show that with the catalysts according to the invention, it is possible to obtain advantageous yields of olefins without converting large quantities of the starting paraffin to aromatic hydrocarbons.

The results obtained may be compared to their advantage with the catalysts known in the art, and in particular with those which contain only chromium, alumina and potassium, that is to say catalysts without silver.

By creating conditions similar to those indicated in the above examples, but operating with catalysts containing only chromium and potassium deposited on alumina, there are obtained from normal heptane, quantities of normal heptene which do not exceed 3% by weight, whereas the cracking products reach at least 12% and the aromatic hydrocarbons about 8%; not-negligible quantities of iso-heptenes are also formed.

On the contrary, over the silver catalysts according to the invention, there are obtained, as in Example IV at 500° C., more than 8% of normal heptene with only traces of aromatic hydrocarbons and with cracking products which do not exceed 3% by weight.

What we claim is:

1. In a method for the preparation of catalysts for the selective de-hydrogenation of aliphatic hydrocarbons to produce less saturated aliphatic hydrocarbons having the same number of carbon atoms per molecule, the steps which comprise selecting a support of refractory oxide selected from the group consisting of alumina, silica, magnesia, zinc oxide, calcium oxide and mixtures thereof, plunging said support into a solution of silver nitrate having a concentration within the range of about .5–60 grams per liter for about 1–24 hours at about ambient temperature until said support has a metallic silver content up to about 40% by weight of the catalyst, thereafter plunging said support into a solution of potassium chromate having a concentration within the range of about 1–50 grams per liter for about 1–24 hours at about ambient temperature until said support has a metallic chromium content in an amount within the range of about .5% to 15% of the weight of the catalyst, thereafter plunging said support into a solution of an alkali metal salt selected from the group consisting of a salt of potassium, sodium, lithium, rubidium, and caesium, and thereafter plunging said support into a water bath for about 2–6 hours.

2. A method as described in claim 1 in which the support is alumina.

3. A method as described in claim 2 in which the alumina is in the form of balls having a diameter between about 2 and 5 mm.

4. A method as described in claim 3 in which the alumina support is held in the silver nitrate and potassium chromate solutions for a period of time necessary to produce a catalyst having a silver/chromium ratio within the range of about .5/1 and 2.5/1.

5. A method as described in claim 1 in which the alkali metal is potassium nitrate.

6. A method as described in claim 5 in which the potassium nitrate solution has a concentration of 5% by weight of the solution, and in which solution the support is held for a period of time necessary to produce an alkali metal content in the final catalyst within the range of about .2% to 5% by weight of the catalyst.

7. A method as described in claim 6 in which the support is held in the potassium nitrate solution for a period of time necessary to produce an alkali metal content within the range of about 1% to 2.5% by weight of the catalyst.

8. A catalyst composition for the selective de-hydrogenation of aliphatic hydrocarbons consisting of a support selected from the group consisting of alumina, silica, magnesia, zinc oxide, calcium oxide, and mixtures thereof; metallic silver in an amount up to about 40% by weight of the catalyst and metallic chromium in an amount within the range of about .5% to 15% by weight of the catalyst and in an amount forming a silver/chromium atomic ratio within the range of about .5/1 to 2.5/1; and an alkali metal salt selected from the group consisting of potassium, sodium, lithium, rubidium and caesium and in which the alkali metal content of the said catalyst is within the range of about .2% to 5% by weight.

9. A catalyst composition as described in claim 8 in which the support is alumina.

10. A catalyst composition as described in claim 8 in which the metallic chromium content is within the range of about 2% to 10% by weight of the catalyst.

11. A catalyst composition as described in claim 8 in which the alkali metal is potassium.

12. A catalyst composition as described in claim 8 in which the alkali metal content is within the range of about 1% to 2.5% by weight.

13. A catalyst composition as described in claim 8 which also includes beryllium oxide as a promoter.

14. In a method for the catalytic de-hydrogenation of aliphatic hydrocarbons to less saturated hydrocarbons while avoiding the formation of cyclic hydrocarbons, the steps which comprise supplying in a reactor a catalyst having impregnated therein metallic silver in an amount up to about 40% by weight of said catalyst, metallic chromium in an amount within the range of about .5% to 15% by weight of said catalyst, and potassium in an amount within the range of about .2% to 5% by weight of said catalyst, passing said hydrocarbons to be treated through said reactor and over said catalyst at a temperature within the range of about 400° to 550° C. for from about .5 to 40 seconds for said de-hydrogenation thereof, and withdrawing said de-hydrogenated materials from said reactor.

15. A method as described in claim 14 in which the atomic ratio of metallic silver content to metallic chromium content in the said catalyst is within the range of about .5/1 to 2.5/1.

16. A method as described in claim 15 in which the metallic chromium content of the said catalyst in the said reactor is within the range of about 2% to 10% by weight of the catalyst.

17. A method as described in claim 14 in which the potassium content of the catalyst is within the range of about 1% to 2.5% by weight of the catalyst.

18. A method as described in claim 14 in which the reacting temperature is within the range of about 450° C. to 510° C.

References Cited by the Examiner

UNITED STATES PATENTS

| 2,374,932 | 5/1945 | Guyer | 260—683.3 X |
| 2,411,829 | 11/1946 | Huffman | 252—465 |
| 2,754,345 | 7/1956 | Kirschenbaum | 260—683.3 |

DELBERT E. GANTZ, *Primary Examiner.*

G. E. SCHMITKONS, *Assistant Examiner.*